UNITED STATES PATENT OFFICE.

ABRAHAM WIJNBERG, OF AMSTERDAM, NETHERLANDS.

PROCESS FOR REGENERATING DECOLORIZING-CARBON.

1,189,896. Specification of Letters Patent. Patented July 4, 1916.

No Drawing. Application filed March 24, 1914. Serial No. 826,981.

*To all whom it may concern:*

Be it known that I, Dr. ABRAHAM WIJNBERG, a citizen of the city of Amsterdam, a subject of the Queen of the Netherlands, and residing at 567 Heerengracht, Amsterdam, in the Kingdom of the Netherlands, have invented certain new and useful Improvements in the Processes for Regenerating Decolorizing-Carbon, of which the following is a full, clear, and exact description.

In the specification of United States Letters Patent No. 1,074,337, I have described a process of regenerating a particular kind of decolorizing carbon defined in that specification, the regeneration being effected by means of alkaline substances such as solutions of caustic alkalis, alkaline compounds or alkaline earths, for example, caustic soda, caustic potash, carbonate of sodium, carbonate of potassium, etc.

By the term "decolorizing carbon" in the technology of chemistry a special type or sort of carbon is designated and is to be understood, which is characterized by the large percentage of carbon contained in the same and further by the fact, that the same contains very little soluble bodies. The so-called "decolorizing carbons" represent a special type of carbons, which are distinguished from all other carbons of any kind by their great decolorizing capacity, due to the special method by which they are manufactured or produced. It may be understood, that by the term "decolorizing carbons" in the technology of chemistry not ordinary charcoal (wood coal) will be understood, which is obtained either in charcoal piles or by the dry distillation process, nor will by this term bone black be designated.

Decolorizing carbon, the regenerating of which forms the object of the present invention, is a product already in general use and sale and is a known industrial product of manufacture (see *The Oil and Colour Trades Journal*, 1912, pages 1380 and 1429). The same is produced in different ways, for example by subjecting organic substances to be carbonized—or to be transformed—or being already converted into decolorizing carbon, to the treatment of hot or heated gases, such as ammonia, superheated steam, chlorin or other gases, whereby the carbon is subjected to a certain chemical transformation.

A method of preparing the decolorizing carbon is as follows:—Carbon containing substances of vegetable origin, after having been cut into pieces of suitable size, are subjected in a moist condition to a rapid dry distillation at a glowing red heat temperature (light red incandescence) while passing large quantities of steam, or of carbonic acid in contact therewith. The steam or gases are passed through tubes, heated to a glowing red heat (light red incandescence), before being brought into contact with the carbonaceous matter. Most of the liquid or gaseous volatilized products are thereby decomposed into gases indifferent to carbon, as for instance, into hydrogen, carbon monoxid and the like. Due to this fact and contrary to the methods hitherto used, the dry distillation takes place in an atmosphere of indifferent gases, and not in an atmosphere of vapors of pitch, wood-acid, methyl alcohol and similar bodies, which as is known, exercise a detrimental effect on the carbon and spoils the same. When the dry distillation process has been completed the carbon so produced is further subjected to the action of a weak stream of superheated steam, or of carbonic acid, whereby the said carbon is maintained at a temperature of light incandescence (glowing red heat). Thereafter the carbon is cooled down and, according to circumstances, is washed either with pure water, or with suitable acids, as for example hydrochloric acid, or with a mixture of such acids and water, and is then either dried or heated without the presence of air. The foregoing is however only an example, and one of many different methods of manufacturing decolorizing carbon.

It has been found that after repeated regeneration of such carbon by the process described in said patent, there is a distinct loss of efficiency in the decolorizing action of the carbon, in fact I have found that after about 15 or 20 repetitions of use of the best carbon, with regeneration after each use, or at least several regenerations in the course of the work, the efficiency of the carbon is reduced about 50 per cent. I have now found that if, after repeated use of the carbon, I treat the same with a solution of caustic alkalis, alkaline compounds or alkaline earths of a strength ranging, roughly, from 1% to 25% followed by heating to red heat or incandescence, complete regeneration of the carbon is effected, with practically complete elimination of all the foreign matter absorbed by the carbon. I may carry out the treatment with the alkaline solution in the presence of an oxidizing agent, or I may, in addition to the treatment with caustic alkali and heat, treat the carbon with an oxidizing agent.

If the solutions of caustic alkalis, alkaline compounds or alkaline earths are used with a concentration of at least 2 per cent., and the carbon is then heated as described, the regeneration is complete, and the carbon can be used again repeatedly as described in my prior specification cited. That is to say, when the specially regenerated carbon has become saturated with organic matter or other impurities it is sufficient to treat the same by the process described in that prior specification, with solutions of caustic alkalis, alkaline compounds or alkaline earths, without observing any special conditions.

Even if the carbon has been treated 10, 15, or 20 times by the process set forth in the prior specification, and has suffered marked loss of efficiency, and is then treated by the special methods according to this invention, it re-acquires its full original efficiency, that is to say the efficiency of fresh unused carbon.

The alkaline substances which may be used include, as stated in the prior specification, alkaline carbonates.

Examples of suitable oxidizing agents are permanganates, chlorates and hypochlorites; for example such alkaline chlorates as those of sodium or potassium, permanganate of potassium, calcium hypochlorite, etc.

If as a result of repeated use in the manner set forth in the prior specification, followed by treatment according to my present specification (with heat), it is found that there is an undesirable proportion of ash in the substance, the same can be removed by washing with acid, for example hydrochloric acid, if necessary followed by washing with water.

The several improved means or methods of treatment may be used separately or concurrently; for example treatment with an oxidizing agent may take place in the presence of alkali or acid. Thus for example, the carbon may be treated:—(a) With permanganate of potassium alone, or with the permanganate in the presence of caustic alkali, alkaline carbonate of for example sodium or potassium, or acid. (b) With an alkaline chlorate of for example sodium or potassium, and acid. (c) With a hypochlorite of potassium, or sodium, or calcium, with or without acid.

The heating is effected in a suitable oven.

It will be understood that my present invention is primarily intended for the treatment of carbon which has suffered loss of efficiency by reason of repeated use followed by regeneration according to the prior method, but of course I may also adopt the improved method for regenerating carbon which has only been used once or a few times and has not been regenerated by any other method.

I claim:—

1. The process of regenerating decolorizing-carbon containing more than 50 per cent. of carbon and having a decolorizing power higher than bone black, which comprises treating said carbon with solutions having an alkaline reaction, and then heating to a glowing heat.

2. The process of regenerating decolorizing carbon containing more than 50 per cent. of carbon and having a decolorizing power higher than bone black, which comprises treating said carbon with solutions having an alkaline reaction and containing an oxidizing agent, and then heating to a glowing heat.

3. In the process of regenerating decolorizing-carbon containing more than 50 per cent. of carbon and having a decolorizing power higher than bone black, the step which consists in treating said carbon with solutions having an alkaline reaction and containing an oxidizing agent.

4. As a new article of manufacture, regenerated decolorizing carbon containing more than 50 per cent. of carbon and having a decolorizing power higher than bone black, said regenerated decolorizing carbon being the product of the treatment of a used decolorizing carbon with alkaline solutions and then heating to a glowing heat.

In witness whereof, I subscribe my signature, in the presence of two witnesses.

Dr. ABRAHAM WIJNBERG.

Witnesses:
P. WILDERING,
C. KUTH.